Dec. 29, 1959 G. K. GUTTWEIN ET AL 2,919,398

CRYSTAL IMPEDANCE METER

Filed May 2, 1957

INVENTORS,
GUNTER K. GUTTWEIN &
DENNIS POCHMERSKI.
BY
Harry M. Saragovitz
ATTORNEY.

2,919,398

CRYSTAL IMPEDANCE METER

Gunter K. Guttwein, West Long Branch, and Dennis Pochmerski, Freehold, N.J., assignors to the United States of America as represented by the Secretary of the Army Application May 2, 1957, Serial No. 656,738

4 Claims. (Cl. 324—56)

(Granted under Title 35, U.S. Code (1952), sec. 266)

The invention described herein may be manufactured and used by or for the Government for governmental purposes, without the payment of any royalty thereon.

This invention relates to electrical testing and more particularly to the testing of piezoelectric crystals to be used in oscillators and analogous circuits.

One of the equivalent electrical parameters of piezoelectric crystals which is usually measured directly by means of a crystal impedance meter is the effective series-resonant resistance. However, crystal impedance meters presently available have proved to be inadequate for testing crystals adapted to operate at frequencies in excess of 100 megacycles. It is the main object of the present invention to provide an improved crystal impedance meter capable of accurately measuring the effective-series-resonant resistance of piezoelectric crystal units having frequencies higher than 100 megacycles.

It is another object of the present invention to provide an improved crystal impedance meter wherein the effective series-resonant resistance of high frequency crystals may be measured at relatively low crystal power dissipation.

In accordance with the present invention, there is provided a crystal impedance meter which includes a pentode having discrete tuning means in circuit with its plate and control grid to form a tuned-plate-tuned-grid oscillator and wherein the effective series-resonant resistance of a piezo-electric crystal is measured by alternately connecting the crystal and a substitution resistor of prescribed value across a pair of terminals in the feedback path between the plate tuning means and control grid. Included in the feedback path is a grounded-grid amplifier having its cathode capacitively coupled to one of the terminals and its plate connected to the pentode control grid tuning means and capacitively coupled to the pentode control grid.

Figure 1:
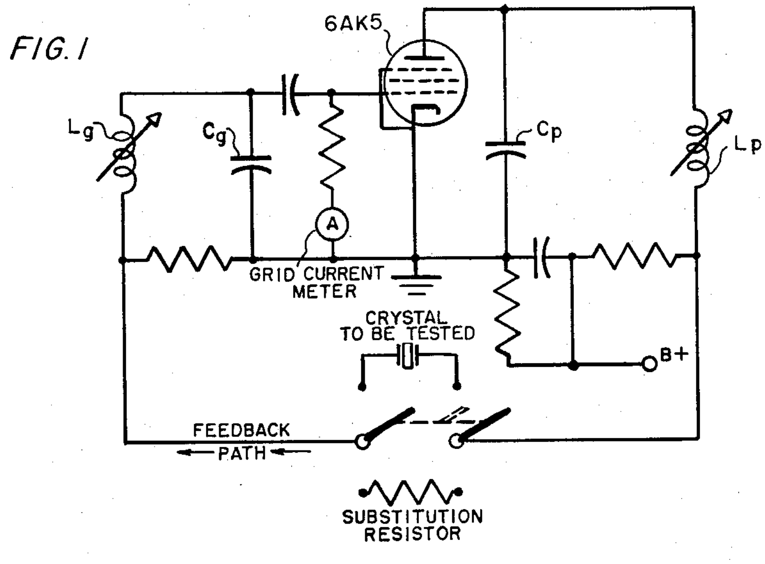
Figure 2:
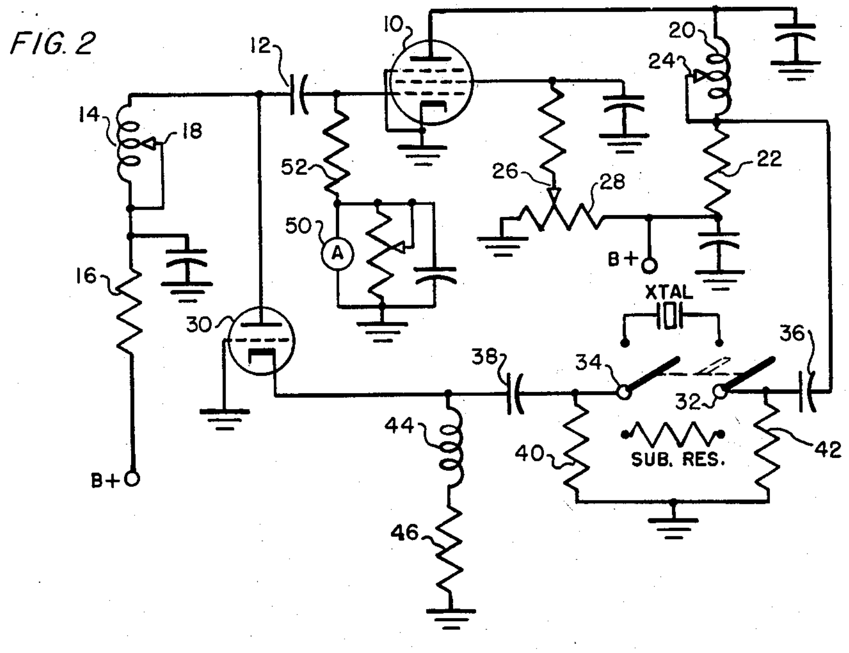

For a better understanding of the invention together with other and further objects thereof, reference is had to the following description taken in connection with the accompanying drawings in which:

Fig. 1 is a schematic representation of the prior art which is included here for use in explaining the present invention; and Fig. 2 is a schematic diagram illustrating the present invention.

Fig. 1 is a simplified schematic diagram of a crystal impedance meter which heretofore has been employed to measure the effective series-resonant resistance of piezoelectric crystals. Basically the circuit shown in Fig. 1 is a tuned-plate-tuned-grid oscillator with the crystal to be tested placed in the main feedback path of the oscillator. The crystal unit is operated at series resonance where it appears as a pure resistance and controls the oscillation frequency of the circuit and the amplitude of oscillation. The frequency is monitored by means of a receiver or other suitable frequency measuring equipment and the amplitude is indicated by the grid current of the oscillator tube. The crystal in the feedback path is then replaced with a substitution resistor. By adjusting the tuning of the grid and plate circuits and choosing a value of substitution resistor such that the same frequency and amplitude are obtained for both the crystal and substitution resistor, both the resonant frequency and the effective series-resonant resistance may be determined at a specific RF power dissipation in the crystal. The magnitude of this dissipation is controlled by the drive level which is a function of the voltage applied to the screen grid of the oscillator tube. It is not necessary that the exact resonance frequency of the crystal unit be known nor is it necessary to be known to measure the effective series-resonant resistance value. The circuit is first tuned to the approximate frequency. Then by alternately switching the crystal unit and the substitution resistance in the main feedback path and by adjustment of the valve of the substitution resistance and of the circuit tuning, the frequency and amplitude of oscillations may be set at values which remain constant when either the crystal unit or the substitution resistance is in circuit. It was found that for a specified passing resistance of 60 ohms, such a circuit will operate up to 85 megacycles. For test crystals whose resistance does not exceed 30 ohms, it was found that such a circuit will operate up to 125 megacycles. Although the losses in the circuit of Fig. 1 at 125 megacycles may be slightly reduced by increasing the drive level to maximum gain, this type of operation has a disadvantage in that the power dissipated in the crystal changes widely with resistance. Since the resistance of test crystals may vary between 20 and 100 ohms, it can be seen that for a specified power dissipation of 2 milliwatts, the circuit shown in Fig. 1 could not very well be employed to measure the effective series-resonant resistance of crystals adapted to resonate at frequencies ranging from 100 to 200 megacycles.

Fig. 2 illustrates the improved two-stage crystal impedance meter in accordance with my invention. At 10 there is shown a pentode, preferably a 6AK5 type tube, having its control grid coupled through capacitor 12 to one end of tuning inductor 14 which is connected to B+ through resistor 16. The anode of tube 10 is connected to B+ through the series arrangement of tuning inductor 20 and resistor 22. As shown, inductor 14 is tuned by means of a slider arm 18 which is connected to the junction of inductor 14 and resistor 16, and inductor 20 is tuned by means of a slider arm 24 connected to the junction of inductor 20 and resistor 22. The screen grid of tube 10 is connected to the slider arm 26 of a potentiometer 28 connected between ground and B+ and the cathode and suppressor grid of tube 10 are grounded as shown. Coupled between the junction of capacitor 12 and tuning inductor 14 and the junction of tuning inductor 20 and resistor 22 is a feedback circuit comprising a grounded-grid triode amplifier 30, preferably 6AN4 type tube, and a pair of terminals 32 and 34 across which the crystal to be tested and the substitution resistor are to be alternately connected. As shown, terminal 32 is coupled to the junction of tuning inductor 20 and resistor 22 through capacitor 36, and the terminal 34 is coupled to the cathode of grounded-grid amplifier 30 through capacitor 38. The plate of grounded-grid amplifier 30 is connected to the junction of capacitor 12 and tuning inductor 14. Each of the terminals 32 and 34 is connected to ground through respective resistors 40 and 42 and the cathode of amplifier 30 is connected to ground through radio frequency choke coil 44 and resistor 46. Resistors 40, 42, 46, and choke coil 40, comprise a conventional crystal pi-network which matches the low series resonant impedance of the crystals to be tested. A conventional grid-current meter 50 is connected between ground and the control grid of tube 10 through resistor 52.

The operation of the two-stage crystal impedance meter of Fig. 2 is similar to that shown in Fig. 1 in that it also functions as a tuned-plate-tuned-grid oscillator. The basic difference of course is that the feedback circuit from the plate of tube 10 to the control grid thereof now includes a crystal pi-network the output of which is amplified by grounded-grid amplifier 30. In this manner, the maximum available gain of the system is increased by approximately a factor of 8 at 200 megacycles and the crystal power dissipation can be kept low inasmuch as the control grid of tube 10 is not driven by the crystal pi-network. Another desirable feature of the two-stage circuit shown in Fig. 2 is that it provides a fairly constant power dissipation independent of crystal resistance.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an oscillator circuit adapted to measure the effective series-resonant resistance of a piezoelectric crystal, said circuit including a pentode type tube and tuning means in circuit with the control grid and plate of said pentode to form a tuned-plate-tuned-grid oscillator; a feedback path for said oscillator in circuit with said plate tuning means and said control grid, said feedback path comprising a pair of terminals for accepting said crystal and a grounded-grid amplifier tube in series connection.

2. The circuit in accordance with claim 1 wherein one of said terminals is capacitively coupled to the cathode of said grounded-grid amplifier and said control grid is capacitively coupled to the plate of said grounded-grid amplifier.

3. In a circuit including a pentode having discrete tuning means in circuit with its plate and control grid to form a tuned-plate-tuned-grid oscillator and wherein the effective series-resonant resistance of a piezoelectric crystal is measured by alternately connecting said crystal and a resistor of prescribed value across a pair of terminals in the feedback path of said oscillator between the plate tuning means and said grid; the improvement in said circuit comprising a grounded-grid amplifier in series connection with said pair of terminals and said control grid.

4. In a circuit including a pentode having discrete tuning means in circuit with its plate and control grid to form a tuned-plate-tuned-grid oscillator and wherein the effective series resonant resistance of a piezoelectric crystal is measured by alternately connecting said crystal and a resistor of prescribed value across a pair of terminals in the feedback path of said oscillator between said grid and plate tuning means; the improvement in said circuit comprising a grounded-grid triode amplifier having its cathode capacitively coupled to one of said terminals and its plate connected to the pentode control grid tuning means and capacitively coupled to the pentode control grid.

References Cited in the file of this patent

"Crystal Impedance Meters," Electronics, May 1953, vol. 26, pp. 176–180.